(12) United States Patent
Takahashi

(10) Patent No.: US 7,253,591 B2
(45) Date of Patent: Aug. 7, 2007

(54) ELECTRIC POWER GENERATION CONTROL APPARATUS

(75) Inventor: Keiji Takahashi, Kariya (JP)

(73) Assignee: Denso Corporation, Kariya (JP)

(*) Notice: Subject to any disclaimer, the term of this patent is extended or adjusted under 35 U.S.C. 154(b) by 43 days.

(21) Appl. No.: 11/340,618

(22) Filed: Jan. 27, 2006

(65) Prior Publication Data
US 2006/0186862 A1 Aug. 24, 2006

(30) Foreign Application Priority Data
Feb. 22, 2005 (JP) .............................. 2005-044904

(51) Int. Cl.
*H02P 9/10* (2006.01)
(52) U.S. Cl. .............................. 322/59; 322/23; 322/37
(58) Field of Classification Search .................... 322/6, 322/20, 22, 23, 24, 28, 37, 59, 99
See application file for complete search history.

(56) References Cited

U.S. PATENT DOCUMENTS

| 5,565,760 A | * | 10/1996 | Ball et al. ...................... 322/23 |
| 5,719,484 A | * | 2/1998 | Taniguchi et al. ............. 322/20 |
| 6,346,797 B1 | * | 2/2002 | Perreault et al. ............... 322/29 |
| 6,750,635 B2 | * | 6/2004 | Harmon ........................ 322/29 |
| 6,803,748 B2 | * | 10/2004 | Peter ............................ 322/29 |
| 2004/0061482 A1 | | 4/2004 | Taniguchi |
| 2006/0022647 A1 | | 2/2006 | Asada |

FOREIGN PATENT DOCUMENTS

JP A 62-203599 9/1987

* cited by examiner

*Primary Examiner*—Nicholas Ponomarenko
(74) *Attorney, Agent, or Firm*—Oliff & Berridge PLC

(57) ABSTRACT

An electric power generation control apparatus has a bridge circuit, a voltage detection circuit, an electric generation control circuit, and an operation mode setting circuit. The bridge circuit has power transistors and diodes through which a field current is supplied to a vehicle alternator driven by a vehicle engine. The voltage detection circuit outputs an instruction signal regarding ON and OFF of supply of the field current so that the output voltage of the vehicle alternator becomes an adjusting voltage. The electric generation control circuit controls the ON and OFF of the power transistors according to the instruction signal from the voltage detection circuit. The operation mode setting circuit selects one of a field wheeling mode and a regenerative mode based on the OFF state of one power transistor, and also selects the regenerative mode when receiving a generation halt instruction form an ECU in the vehicle.

11 Claims, 5 Drawing Sheets

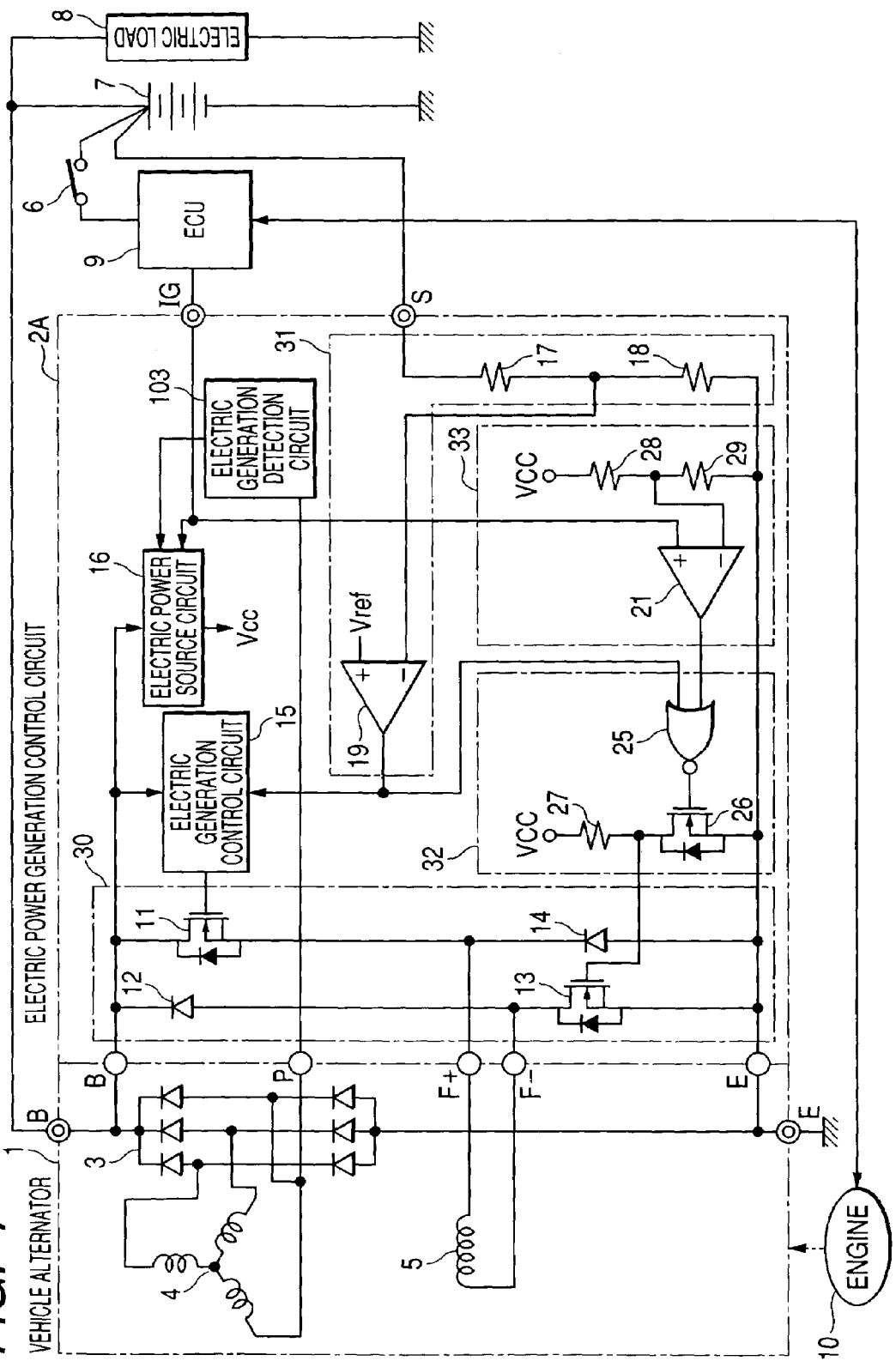

ELECTRIC POWER GENERATION CONTROL APPARATUS

CROSS-REFERENCE TO RELATED APPLICATIONS

This application is related to and claims priority from Japanese Patent Application No. 2005-044904 filed on Feb. 22, 2005, the contents of which are hereby incorporated by reference.

BACKGROUND OF THE INVENTION

1. Field of the Invention

The present invention relates to an electric power generation control apparatus capable of controlling an electric power generation of a vehicle alternator mounted on a vehicle such as a passenger car and a truck.

2. Description of the Related Art

In the recent years, there has increased a tendency to effectively use the amount of electric power generation of a vehicle alternator mounted on a vehicle and rotationally driven by an internal combustion engine mounted on the vehicle. In order to achieve such a demand, there are conventional well-known techniques comprising an electric power generation control apparatus for effectively using the electric power generated by the vehicle alternator. The electric power generation control apparatus controls the regeneration to supply an exciting current for a rotor of the vehicle alternator to a battery by using a transistor chopper exciting circuit. For example, Japanese laid open publication No. S62-203599 has shown one of those conventional techniques.

In the electric power generation control apparatus, a field winding is connected to a bridge circuit that comprises a pair of arms made of power transistors and a pair of arms made of diodes. The ON and OFF control of the power transistors allows to flow the exciting current through the field winding from a battery through the bridge circuit, and also allows the regeneration of the exciting current flowing through the field winding to the battery through the bridge circuit.

The technique disclosed in the Japanese patent laid open publication No. 62-203599 is capable of performing the regeneration of electric power in spite of the state of the generation of the electric power in a vehicle alternator. This technique involves a drawback in which sparks thereby arise at the electric power terminals of the battery because the battery cannot receive the regenerated electric power under the state of electric load of a relatively low, of a high capability of the electric power generation (a high speed revolution of an internal combustion engine), and of a fully charged battery.

On the contrary, no sparks occurs at the electric power terminals of the battery if the electric power generation control apparatus disclosed in the conventional technique, for example as disclosed above, is not used. However, this requires a long time period until the adequate reduction of a fly wheeling current when the circulation current flows through a fly wheeling diode, and it further takes a long time period until the adequate reduction of torque of the vehicle alternator when an electric load enters ON and the like. As a result, this case causes a problem that the number of revolution of the engine is reduced. In particular, during the idling of the engine, a large reduction of the number of revolution of the engine has a high possibility to cause an engine stall. In order to avoid the engine stall, it is necessary to increase the number of revolution of the engine during the idling. However, this requirement is contrary to the recent demand of enhancement of fuel economy and of reduction of noise.

SUMMARY OF THE INVENTION

The present invention has been made in consideration of those drawbacks of the prior art described above. An object of the present invention is to provide an electric power generation control apparatus capable of preventing generation of spike noise and of preventing a large reduction of the number of revolution of an engine.

In accordance with one aspect of the present invention, an electric power generation control apparatus has a bridge circuit, a voltage detection circuit, an electric generation control circuit, and an operation mode setting circuit. The bridge circuit has a pair of power transistors as oppose to each other and a pair of diodes as oppose to each other, the bridge circuit supplies a field current to a vehicle alternator. The voltage detection circuit generates and outputs a control signal indicating ON and OFF operation for supplying the field current in order to set an output voltage generated by the vehicle alternator into an adjusting voltage. The electric generation control circuit controls ON and OFF operation of the power transistors according to the control signal transferred from the voltage detection circuit.

The operation mode setting circuit selects one of a fly wheeling mode and a regenerative mode, and to select the regenerative mode when receiving an external instruction, transferred from an external device, indicating to halt the generation of the electric power. In the fly wheeling mode, the voltage control circuit controls one of a pair of the power transistors into ON state and the other power transistor into OFF state. In the regenerative mode, the voltage control circuit controls a pair of the power transistors into OFF state simultaneously.

BRIEF DESCRIPTION OF THE DRAWINGS

For a better understanding of the present invention and to show how the same may be carried out into effect, there will now be described by way of example only, specific embodiments and methods according to the present invention with reference to the according to the present invention.

FIG. 7 is a diagram showing another configuration of the electric power generation control apparatus according to a third embodiment.

DETAILED DESCRIPTION OF THE PREFERRED EMBODIMENTS

Figure 1:
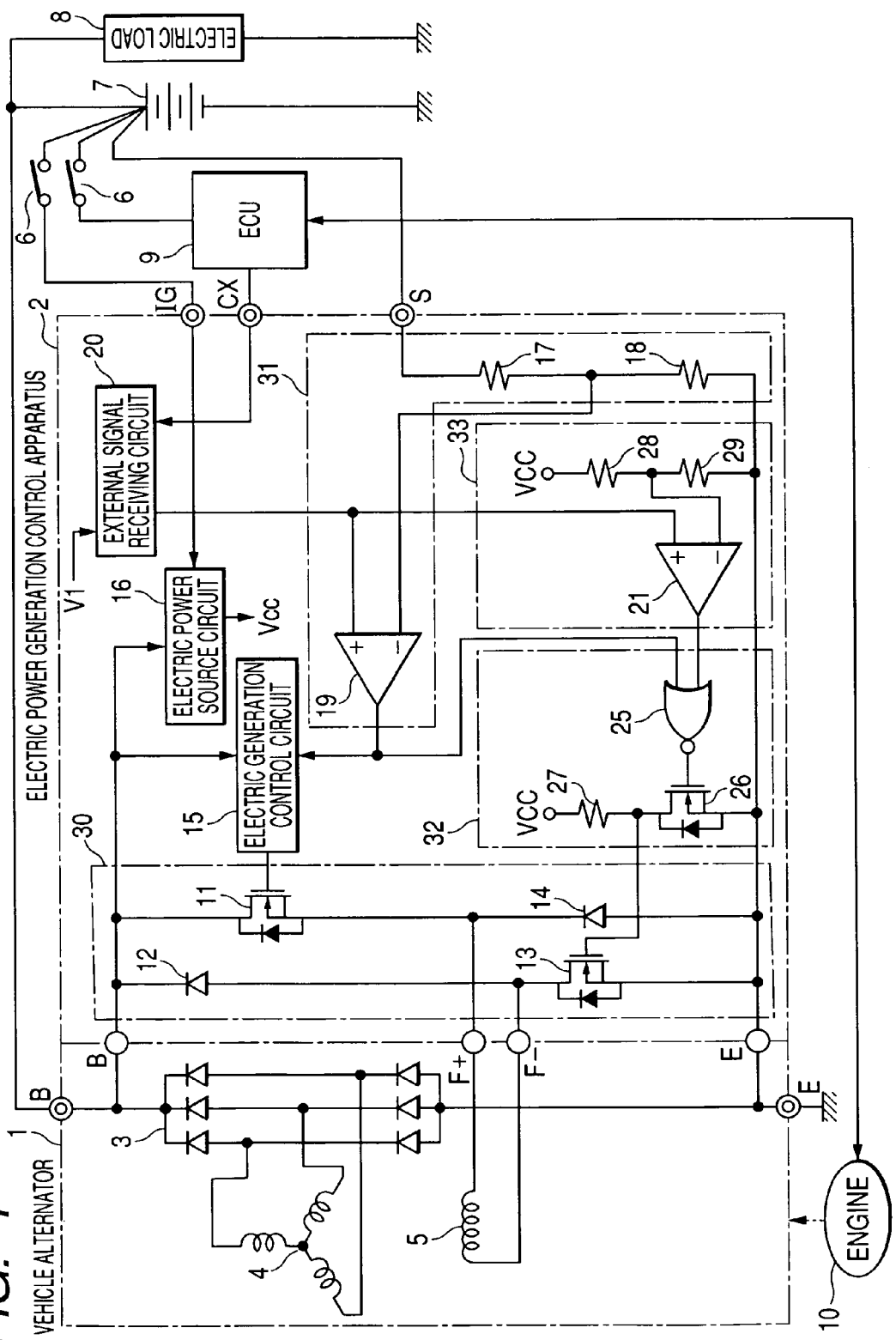
FIG. 1 is a diagram showing a configuration of an electric power generation control apparatus as a first embodiment according to the present invention.

Hereinafter, various embodiments of the present invention will be described with reference to the accompanying drawings. In the following description of the various embodiments, like reference characters or numerals designate like or equivalent component parts throughout the several views.

FIG. 1 is a diagram showing a configuration of an electric power generation control apparatus 2 as the first embodiment according to the present invention. FIG. 1 shows a connection state between the electric power generation control apparatus 2, a vehicle alternator 1, a battery 7, an engine 10 of the vehicle, and other elements.

In FIG. 1, the electric power generation control apparatus 2 controls so that a voltage at a terminal S is set to a given adjusting voltage set value (for example, 14 voltages) that is determined by a voltage at an external signal input terminal CX. Through the terminal S, a voltage applied to the battery 7 is detected. Through an ignition supporting detection terminal IG (hereinafter as referred to "detection terminal IG") the electric power generation control apparatus 2 is connected to the battery 7. The electric power generation control apparatus 2 initiates to perform the control operation of the electric power generation in the vehicle alternator 1 when an ignition switch 6 enters ON.

The vehicle alternator 1 comprises a three-phase stator winding 4, a rectifier circuit 3 for performing a full wave rectification of a three phase voltage output from the stator winding 4, a field winding 5 in a rotor (omitted from drawings).

The electric power generation control apparatus 2 controls the output voltage from the vehicle alternator 1 by performing ON and OFF control of the electric power to be supplied to the field winding 5.

An output terminal B of the vehicle alternator 1 designated by reference character "B⊙" is connected to both the battery 7 and the electric load 8. Through the terminal B designated with "B⊙", the charging current is supplied to the battery 7.

Next, a description is now be given of a detailed configuration and operation of the electric power generation control apparatus 2.

As shown in FIG. 1, the electric power generation control apparatus 2 comprises a bridge circuit 30, a voltage detection circuit 31, an operation mode setting circuit 32, a comparison circuit 33, an electric generation control circuit 15, an electric power source circuit 16, and an external signal receiving circuit 20.

The electric power source circuit 16 generates a given operation voltage Vcc according to rising the voltage at the detection terminal IG when the ignition switch 6 of the vehicle enters ON. The electric power source circuit 16 then supplies the generated operation voltage Vcc to each circuit elements such as the operation mode setting circuit 32 and the comparison circuit 33 installed in the electric power generation control apparatus 2. When receiving the operation voltage Vcc, each circuit element in the electric power generation control apparatus 2 enters ON state.

The bridge circuit 30 supplies a field current to the field winding 5. The bridge circuit 30 is composed of a pair of MOS transistors 1 and 13 (as power transistors) as oppose to each other and a pair of diodes 12 and 14 as oppose to each other. The diode 14 as one of the diodes acts as a fly wheeling diode.

The voltage detection circuit 31 instructs or controls the ON and OFF operation of the MOS transistor 11 in the bridge circuit 30 so that the voltage at a terminal S is set to a given voltage. The voltage at the terminal S corresponds to the output voltage of the vehicle alternator 1.

The electric generation control circuit 15 is placed between the voltage detection circuit 31 and the MOS transistor 11 in the bridge circuit 30 and acts as a driving circuit for driving the MOS transistor 11.

The voltage detection circuit 31 has a voltage comparator 19 and two resistances 17 and 18. A voltage obtained by dividing the voltage at the terminal S by the resistances 17 and 18 is supplied to a minus input terminal of the voltage comparator 19. A reference voltage (as will be explained later in detail) output from the external signal receiving circuit 20 is supplied to a plus terminal of the voltage comparator 19.

The voltage comparator 19 outputs the low level signal when the voltage at the terminal S exceeds a set value of an adjusting voltage. The output low level signal from the voltage comparator 19 is supplied to the electric generation control circuit 15 in a following stage. The output low level signal acts as an instruction signal so that the electric generation control circuit 15 sets the MOS transistor 11 into the OFF state. Thereby the MOS transistor 11 enters OFF state.

On the contrary, the voltage comparator 19 outputs a high level signal when the voltage at the terminal S is not more than the set value of the adjusting voltage. The high level signal output from the voltage comparator 19 is supplied to the electric generation control circuit 15. The output high level signal acts as an instruction signal so that the electric generation control circuit 15 sets the MOS transistor 11 into the ON state. Thereby the MOS transistor 11 enters ON state.

The external signal receiving circuit 20 judges a content of an external signal indicating a duty ratio when the terminal CX receives the external signal indicating an adjusting voltage level transferred from an engine control unit (ECU) as an external device. The external signal receiving circuit 20 generates and outputs to the plus terminal of the voltage comparator 19 a reference signal corresponding to the adjusting voltage value determined by the duty ratio as has been judged.

The operation mode setting circuit 32 comprises a NOR circuit 25, a transistor 26, and a resistance 27 so as to drive the MOS transistor 13 in the bridge circuit 30. The NOR circuit 25 outputs a low level signal when al least one of the input terminals of the NOR circuit 25 receives the high level signal. The NOR circuit 25 outputs a high level signal when both the input terminals thereof receive the low level signals.

The gate of the transistor 26 is connected to an output terminal of the NOR circuit 25 and a drain of the transistor 26 is connected to the power source Vcc through the resistance 27. The source of the transistor 26 is grounded. The drain of the transistor 26 is also connected to the gate of the other MOS transistor 13 in the bridge circuit 30. When the NOR circuit 25 outputs the low level signal, the transistor 26 enters OFF state and the MOS transistor 13 thereby enters ON state.

When the operation mode setting circuit 32 sets the MOS transistor 13 to ON state and the electric generation control circuit 15 controls ON and OFF operation of the MOS transistor 11, the fly wheeling mode thereby enters ON. When the electric generation control circuit 15 performs a synchronous control of the ON and OFF operation of both the MOS transistors 11 and 13, the regenerative mode enters ON.

The comparison circuit 33 comprises a voltage comparator 29 and both resistances 28 and 29 so as to compare the reference voltage corresponding to the adjusting voltage set value determined by the external signal with the given voltage.

The comparison circuit 33 determines a given voltage to be a reference voltage by dividing the voltage Vcc by the resistances 28 and 29. The voltage comparator 21 in the comparison circuit 33 compares the adjusting voltage value determined by the external signal with the reference voltage.

One input terminal of the NOR circuit 25 in the operation mode setting circuit 32 is connected to the output terminal of the voltage comparator 21 in the comparison circuit 33, and the other input terminal of the NOR circuit 25 is connected to the output terminal of the voltage comparator 19 in the voltage detection circuit 31. Accordingly, the NOR circuit 25 outputs the high level signal only when the voltage comparator 19 outputs the low level signal and the voltage level at the terminal S is higher than the adjusting voltage level and when the voltage comparator 19 outputs the low level signal and the adjusting voltage value determined by the external signal exceeds the adjusting voltage level. When the NOR circuit 25 outputs a high level signal, the transistor 26 enters ON state, so that the operation mode setting circuit 32 outputs a control signal to the MOS transistor 13 in order to enter the MOS transistor 13 into OFF state. When the MOS transistor 13 thereby enters OFF state, the regenerative mode to flow the field current from the field winding 5 to the battery 7 is initiated. That is, when the MOS transistor 11 in the bridge circuit 30 enters OFF and the voltage level at the F-terminal of the field winding 5 becomes a high level, the field current flows from the field winding 5 to the battery 7 through the diode 12 and the terminal designated by reference character "B○" and the terminal designated by reference character "B⊙". The field current is thereby regenerated.

In other cases, that is, when following conditions (1), (2), and (3) are satisfied, the operation mode setting circuit 32 outputs a control signal to the MOS transistor 13 in order to enter the MOS transistor 13 into the ON state because the NOR circuit 25 outputs the low level signal.

(1) The voltage comparator 21 outputs the low level signal when the adjusting voltage value determined by the external signal is lower than the given adjusting voltage value, and the voltage comparator 19 outputs the high level signal when the voltage at the terminal S is lower than the adjusting voltage value;

(2) The voltage comparator 19 outputs the low level signal when the voltage at the terminal S is higher than the adjusting voltage value, and the voltage comparator 21 outputs the high level signal when the adjusting voltage value determined by the external signal is higher than the given adjusting voltage value; and (3) The voltage comparator 21 outputs the high level signal when the adjusting voltage value determined by the external signal is higher than the given adjusting voltage value, and the voltage comparator 19 outputs the high level signal when the voltage at the terminal S is lower than the adjusting voltage value.

Those conditions (1) to (3) initiate the fly wheeling mode to flow the field current from and to the field winding 5 through the fly wheeling diode 14 and the MOS transistor 13 because the NOR circuit 25 outputs the low level signal and the transistor 26 thereby enters ON state, so that the operation mode setting circuit 32 outputs a control signal to the MOS transistor 13 in order to enter the MOS transistor 13 into ON state. That is, when the MOS transistor 11 in the bridge circuit 30 enters OFF state and the voltage level at the terminal F- of the field winding 5 becomes high, the fly wheeling mode is performed in which the field current flows in a closed circuit formed by the MOS transistor 13 under ON state, the field winding 5, and the fly wheeling diode 14.

Figure 2:
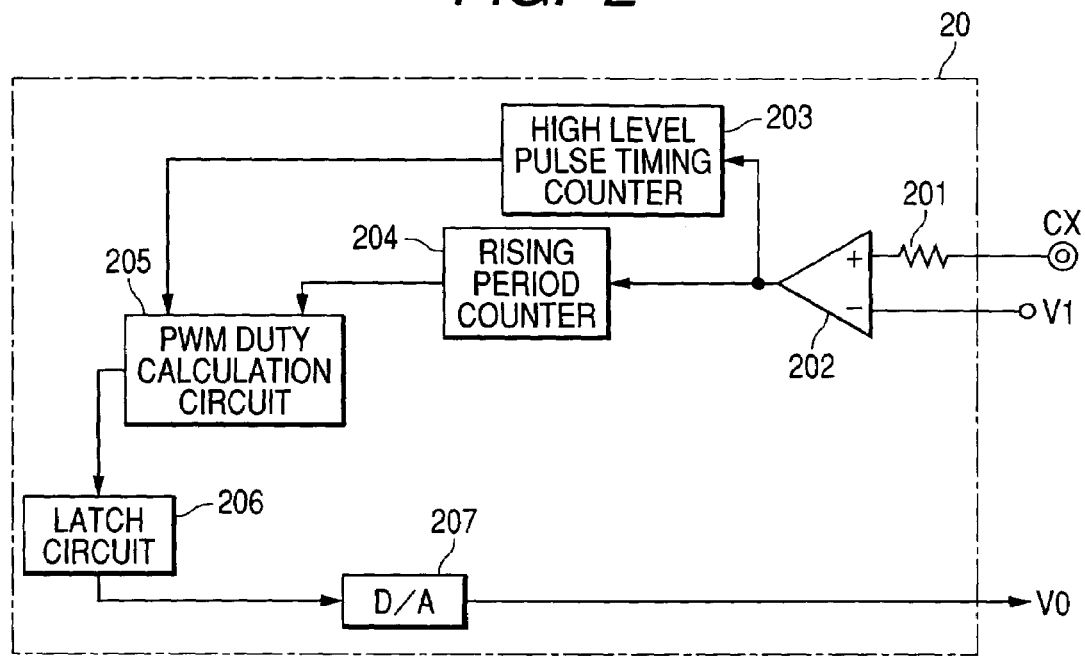
FIG. 2 is a diagram showing a detailed configuration of an external signal receiving circuit in the electric power generation control apparatus of the first embodiment.

FIG. 2 is a diagram showing a detailed configuration of the external signal receiving circuit 20 in the electric power generation control apparatus 2 according to the first embodiment.

As shown in FIG. 2, the external signal receiving circuit 20 comprises a resistance 201, a voltage comparator 202, a high level pulse timing counter 203, a rising period counter 204, a PWM (pulse width modulation) duty calculation circuit 205, a latch circuit 206, and a digital to analogue conversion circuit 207.

The ECU (engine control unit) 9 outputs the external signal having a given duty ratio. When the electric power generation control apparatus 2 receives the external signal through the terminal CX designated by reference character "⊙ CX", the voltage comparator 202 in the external signal receiving circuit 20 outputs a control signal, the level of which is changed in same timing according to the level of the external signal. The high level pulse timing counter 203 counts the timing during the high level of the external signal. The rising period counter 204 counts a timing period from a rising time of the external signal to a following rising time thereof. The PWM duty calculation circuit 205 calculates a duty ratio of the external signal by dividing the counted value obtained from the high level pulse timing counter 203 by the counted value obtained from the rising period counter 204. The latch circuit 206 inputs and keeps the duty ratio (as digital data) of the external signal calculated by the PWM duty calculation circuit 205. The digital to analogue conversion circuit 207 converts the duty ratio (as digital data) of the external signal kept in the latch circuit 206 into the reference voltage corresponding to the adjusting voltage set value as analogue data, and outputs the converted one. The external signal receiving circuit 20 has the circuit configuration described above.

The ECU 9 can change the adjusting voltage set value for the vehicle alternator 1 by changing the duty ratio of the external signal to be transferred to the electric power generation control apparatus 2 through the terminal CX.

Next, a description will now be given of an actual operation of the electric power generation control apparatus 2 according to the first embodiment.

Figure 3:
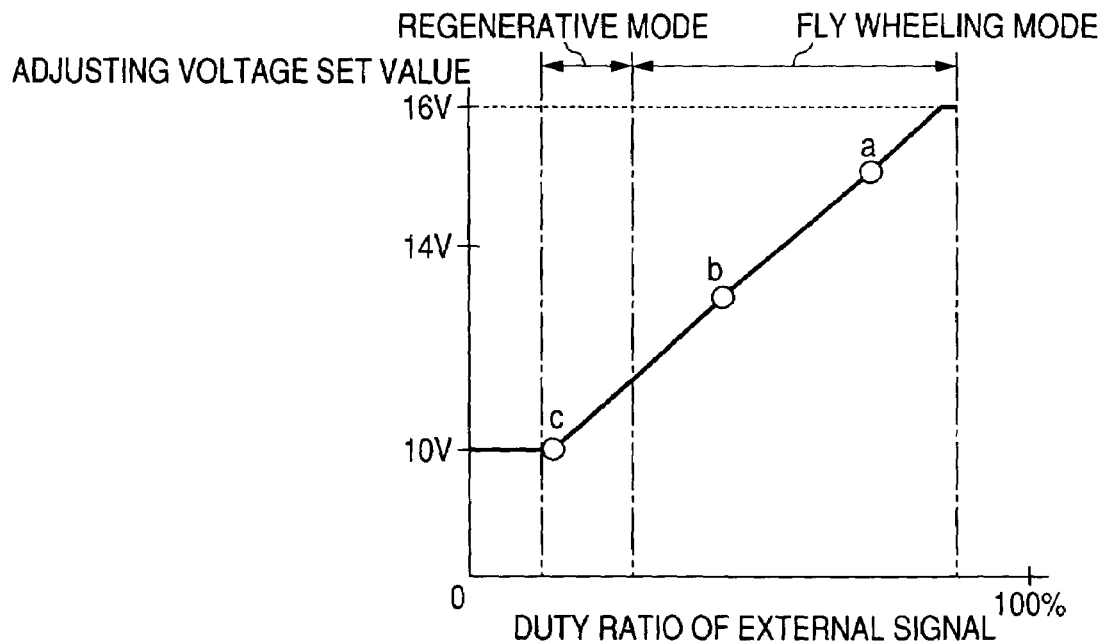
FIG. 3 is a diagram showing a concrete example of an adjusting voltage as a set value determined based on a duty ratio of the external signal.

FIG. 3 is a diagram showing a concrete example of the adjusting voltage set value determined based on the duty ratio of the external signal.

In FIG. 3, the horizontal axis shows the duty ratio of the external signal and the vertical axis shows the adjusting voltage set value. Reference characters "a" and "b" designate the reference voltage output from the external signal receiving circuit 20 when the duty ratio (for example, 30 percentages) is higher than the duty ratio of the external signal. The duty ratio (for example, 30 percentages) corresponds to the given voltage to be generated by the voltage divider composed of both the resistances 28 and 29.

On the other hand, reference character "c" in FIG. 3 corresponds to the reference voltage output from the external signal receiving circuit 20 when the duty ratio of the external signal is lower than the duty ratio (for example, 30 percentages) corresponds to the given voltage as the reference voltage. This external signal instructs to halt the generation of the electric power by the vehicle alternator 1.

Figure 4:
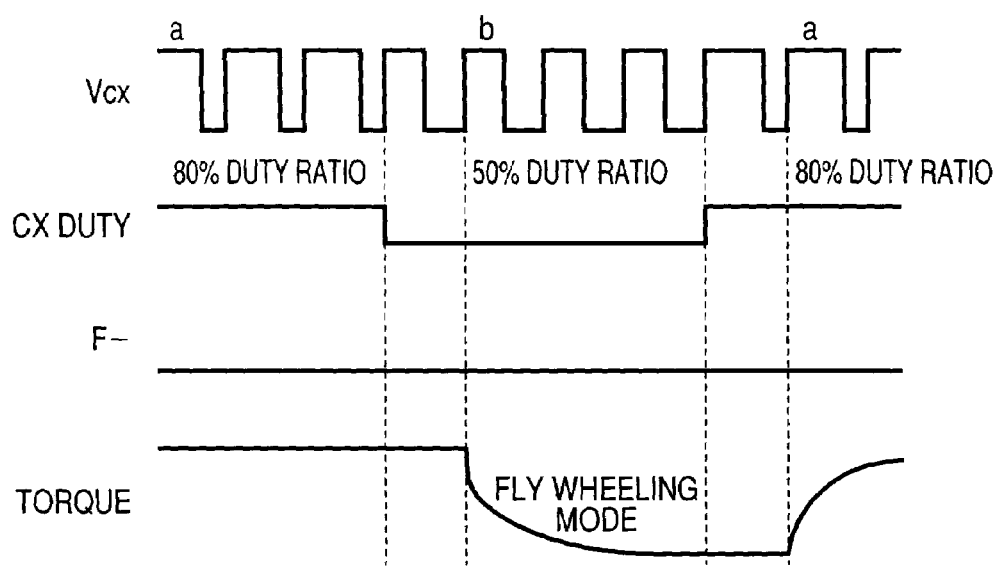
FIG. 4 is a diagram showing the state when an adjusting voltage as a set value is changed from point "a" to point "b" in the electric power generation control apparatus of the first embodiment.

FIG. 4 is a diagram showing the state when the adjusting voltage set value is changed from point "a" to point "b" in the electric power generation control apparatus 2 according to the first embodiment. The point "a" shows the duty ratio of 80 percentages and the point "b" denotes the duty ratio of 50 percentages.

In FIG. 4, reference character "Vcx" designates the voltage at the terminal CX, "CX DUTY" denotes the duty ratio of the external signal to be supplied to the terminal CX, "F-" indicates the voltage at the connection point of the field winding 5 and the MOS transistor 13, and "TORQUE" designates a generation torque or a driving torque of the vehicle alternator 1. The voltage comparator 21 in the comparison circuit 33 outputs the high level signal because there is a case in FIG. 4 that the change of the adjusting voltage set value is not lower than the duty ratio (for example 30 percentages) corresponding to the given reference value. The MOS transistor 13 keeps ON state in spite of the level of the output voltage from the voltage comparator 19, and the electric power generation control apparatus 2 thereby initiates the fly wheeling mode through the fly wheeling diode 14. The torque of the vehicle alternator 1 is attenuated in an attenuator speed determined by a time constant of the field winding 5.

Figure 5:
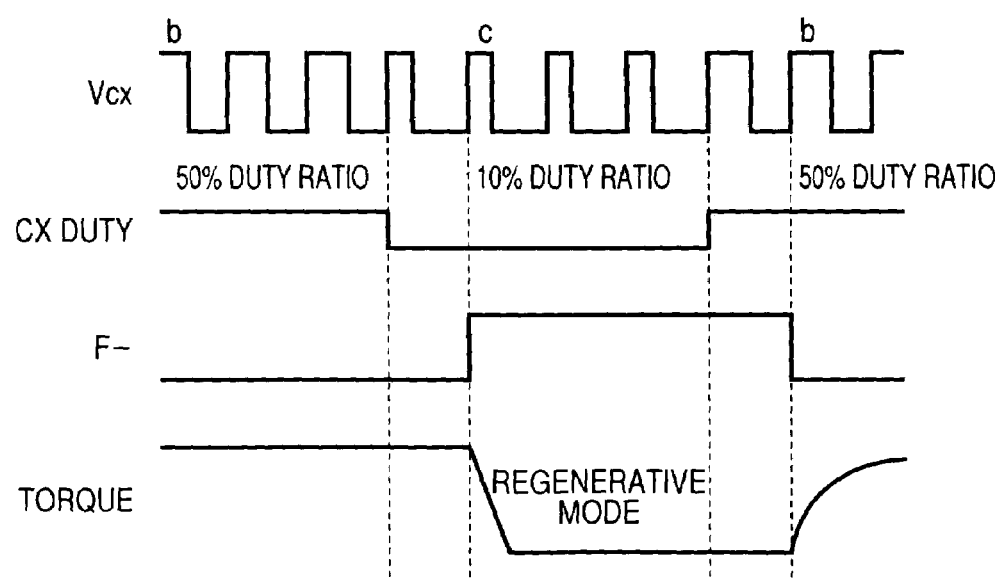
FIG. 5 is a diagram showing the state when the adjusting voltage as a set value is changed from point "b" to point "c" in the electric power generation control apparatus of the first embodiment.

FIG. 5 is a diagram showing the state when the adjusting voltage set value is changed from point "b" to point "c" in the electric power generation control apparatus 2 according to the first embodiment. The point "b" shows the duty ratio of 50 percentages and the point "c" denotes the duty ratio of 10 percentages.

The voltage comparator 21 in the comparison circuit 33 outputs the low level signal because the change of the adjusting voltage set value shown in FIG. 5 is lower than the duty ratio (for example 30 percentages) corresponding to the given reference value. The MOS transistor 13 enters OFF state when the voltage at the terminal S is higher than the adjusting voltage value that is set by the external signal and the voltage comparator 19 thereby outputs the low level signal and the NOR circuit 25 outputs the high level signal to the transistor 26. In this case, the field current flows to the battery 7 through the diode 12 and the terminals designated by reference characters "B⊙" and "B○" because the electric power generation control apparatus 2 thereby initiates the regenerative mode. Accordingly, when compared with the fly wheeling mode shown in FIG. 4, the generation torque of the vehicle alternator 1 is attenuated with a rapid speed as shown in FIG. 5.

Based on the operation described above in detail, even if the number of revolution of the vehicle engine is reduced when the electric load enters ON state and other cases occur, it is possible to enter the field current from the field winding 5 into the regenerating mode by supplying to the electric power generation control apparatus 2 the external signal through the terminal CX from the ECU 9 of the vehicle. Thereby, the generation torque of the vehicle alternator 1 can be attenuated with a higher speed rather than a usual attenuation speed determined by the time constant of the field winding 5.

As described above, even if the number of revolution of the vehicle engine when the electric load enters ON state during the idle revolution operation, it is possible to operate the vehicle alternator 1 in the regenerative mode by transferring the instruction from the ECU 9 in order to reduce the fly wheeling current rapidly. This can achieve a rapid attenuation of the generation torque of the vehicle alternator 1 rather than the usual attenuation speed.

It is thereby possible to avoid any occurrence of engine stole in the vehicle caused by greatly decreasing the number of revolution of the vehicle engine and also possible to reduce the number of revolution of the engine during the idling mode. In particular, the ECU 9 transfers the adjusting voltage set value of a lower value in order to set the vehicle alternator 1 into the generation halting state and it is also possible to perform the generation control in the regenerative mode during the halting mode of the electric power generation.

Further, it is possible that the ECU 9 generates and transfers to halt the electric power generation and enters the vehicle alternator 1 into the regenerative mode only if an emergency state such as decreasing the number of revolution of the engine occurs by entering the electric load to ON state. This can perform the vehicle alternator 1 in the fly wheeling mode during the normal operation state other than the emergency state, and can prevent generation of spike noises.

Second Embodiment

Figure 6:
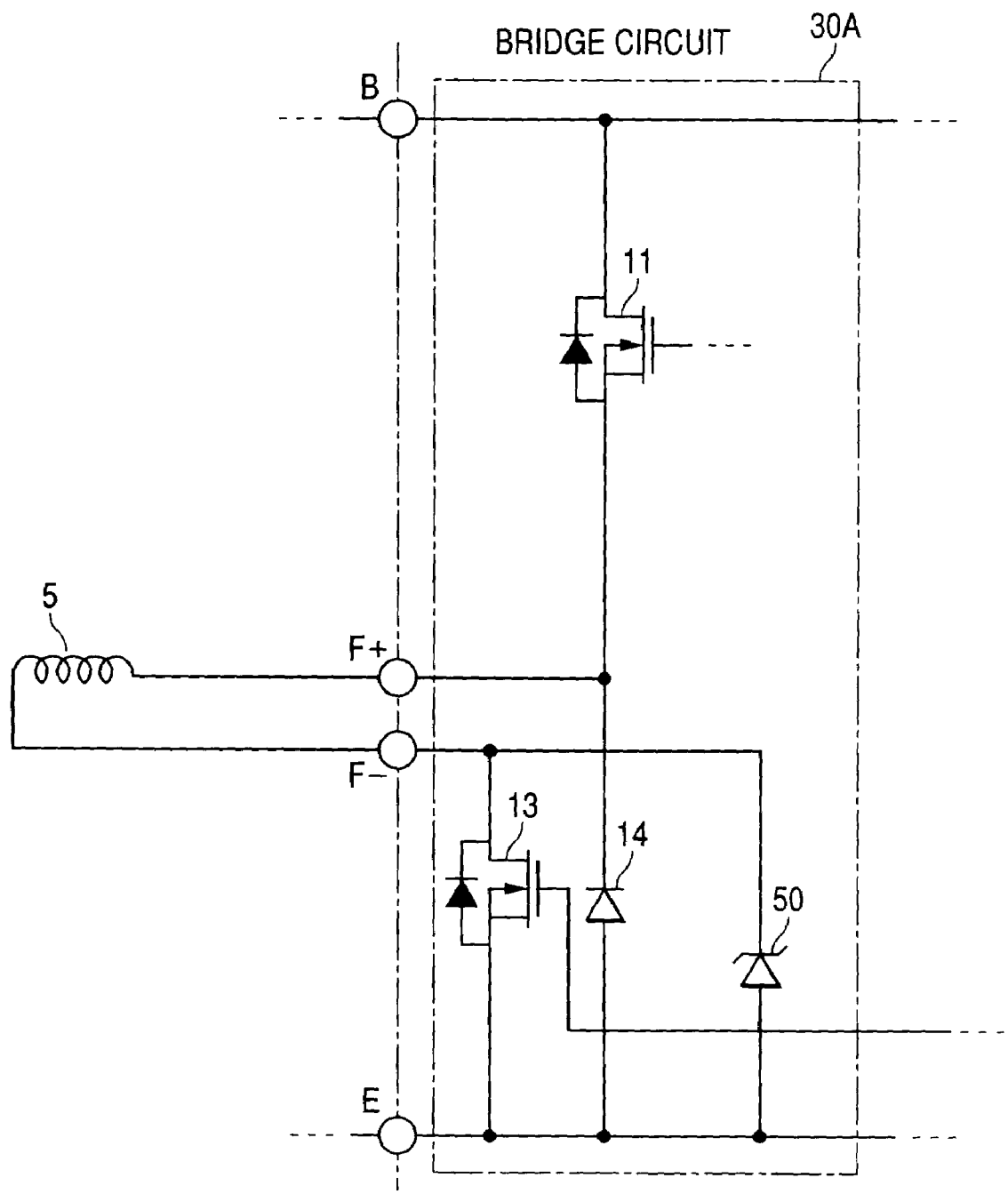
FIG. 6 is a diagram showing another configuration of the bridge circuit installed in the electric power generation control apparatus according to a second embodiment.

FIG. 6 shows a diagram showing another configuration of the bridge circuit installed in the electric power generation control apparatus according to a second embodiment.

The present invention is not limited by the configuration of the electric power generation control apparatus of the first embodiment shown in FIG. 1, for example, it is possible to have another configuration of the bridge circuit in the electric power generation control apparatus 2. Accordingly, FIG. 6 shows only the bridge circuit 30A. Other components are the same as those of the electric power generation control apparatus 2 as the first embodiment, the explanation of the same components is omitted here. FIG. 6 shows only the bridge circuit 30A. Other same components in the electric power generation control apparatus are omitted from FIG. 6.

In the bridge circuit 30A in the electric power generation control apparatus of the second embodiment shown in FIG. 6, a zener diode 50 is used instead of the diode 12 for regenerating the field current to the battery 7 during OFF state of the MOS transistor 13 in the configuration shown in FIG. 1. The zener diode 50 has a zener voltage that is the same of the voltage of the battery 7. The zener diode 50 is a fly wheeling current absorbing element. A cathode of the zener diode 50 is connected to a node at which the MOS transistor 13 is connected to the field winding 5. An anode of the zener diode 50 is grounded. By using the zener diode 50 in the bridge circuit instead of the diode 12, the zener diode 50 absorbs the fly wheeling current generated in the field winding by a reverse electromotive voltage of more than the voltage of the battery 7 and rapidly and easily reduces the torque of the vehicle alternator 1, instead of regenerating the fly wheeling current during the regenerative mode.

Thus, the electric power generation control apparatus of the second embodiment has the same effect of the first embodiment to reduce the torque of the vehicle alternator 1 rapidly than the usual use.

Third Embodiment

FIG. 7 is a diagram showing another configuration of the electric power generation control apparatus according to a third embodiment.

The electric power generation control apparatus 2A shown in FIG. 7 initiates the operation when receiving the external signal as an ignition signal transferred from the ECU 9 through the terminal IG, like the electric power generation control apparatus 2 shown in FIG. 1.

In the electric power generation control apparatus 2A the operation of the electric power source circuit 16 to generate the voltage Vcc is kept or supported by detecting the voltage (as the voltage at the terminal P) generated in the stator winding 4 by an electric generation detection circuit 103 during the generation of the vehicle alternator 1.

When the voltage at the terminal IG is lower than the given voltage, determined by the voltage divider composed of both the resistances 28 and 29, during the revolution of the vehicle alternator 1, the voltage comparator 21 outputs a low level signal. At this condition, the voltage comparator 19 outputs the low level signal when the voltage at the terminal S is higher than the given adjusting voltage value Vref. The NOR circuit 25 in the operation mode setting circuit 32 outputs the high level signal because both the terminal of the operation mode setting circuit 32 input the low level signals from the voltage comparators 19 and 21. The operation mode setting circuit 32 thereby outputs the signal to enter the transistor 13 into OFF state, so that the current operation mode is switched to the regenerative mode to flow the field current into the battery 7.

As described above, because the mode is switched to the regenerative mode by decreasing the voltage to be applied to the terminal IG in the electric power generation control apparatus 2A under the given voltage during the generation of the vehicle alternator 1 (this state corresponds to the generation halting instruction), the electric power generation control apparatus 2A having the configuration described above has the same effect of the electric power generation control apparatus 2 of the first embodiment.

While specific embodiments of the present invention have been described in detail, it will be appreciated by those skilled in the art that various modification and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric power generation control apparatus comprising:
    a bridge circuit comprising a pair of power transistors as oppose to each other and a pair of diodes as oppose to each other, the bridge circuit configured to supply a field current to a vehicle alternator;
    a voltage detection circuit configured to generate and output a control signal indicating ON and OFF operation for supplying the field current in order to set an output voltage generated by the vehicle alternator to an adjusting voltage;
    an electric generation control circuit configures to control ON and OFF operation of the power transistors according to the control signal transferred from the voltage detection circuit; and
    an operation mode setting circuit configured to select one of a fly wheeling mode and a regenerative mode, and to select the regenerative mode when receiving an external instruction, transferred from an external device, indicating to halt the generation of the electric power, where in the fly wheeling mode, the voltage control circuit controls one of a pair of the power transistors into ON state and the other power transistor into OFF state, and in the regenerative mode, the voltage control circuit controls a pair of the power transistors into OFF state simultaneously.

2. The electric power generation control apparatus according to claim 1, further comprising:
    an external signal receiving circuit configured to receive the external signal transferred from the external device and to judge the content of the external signal, and to generate a desired adjusting voltage based on the content of the external signal; and
    a comparison circuit configured to compare the adjusting voltage from the external signal receiving circuit with a given value,
    wherein the operation mode setting circuit selects the regenerative mode when a result of the comparison circuit indicates that the adjusting voltage is not more than the given value.

3. The electric power generation control apparatus according to claim 1, further comprising a comparison circuit configured to compare a given value with a voltage of an external signal, transferred from the external device, for permitting initiation of the electric power generation by the vehicle alternator, wherein the operation mode setting circuit selects the regenerative mode when a result of the comparison circuit indicates that the voltage of the external instruction signal is not more than the given value.

4. The electric power generation control apparatus according to claim 1, wherein a pair of the diodes as oppose to each other in the bridge circuit are composed of a fly wheeling diode and a fly wheeling current absorbing element.

5. The electric power generation control apparatus according to claim 2, wherein a pair of the diodes as oppose to each other in the bridge circuit are composed of a fly wheeling diode and a fly wheeling current absorbing element.

6. The electric power generation control apparatus according to claim 3, wherein a pair of the diodes as oppose to each other in the bridge circuit are composed of a fly wheeling diode and a fly wheeling current absorbing element.

7. The electric power generation control apparatus according to claim 4, wherein the fly wheeling current absorbing element is a zener diode of a zener voltage that is equal in level to a voltage at a terminal of a battery to be connected to the vehicle alternator.

8. The electric power generation control apparatus according to claim 5, wherein the fly wheeling current absorbing element is a zener diode of a zener voltage that is equal in level to a voltage at a terminal of a battery to be connected to the vehicle alternator.

9. The electric power generation control apparatus according to claim 6, wherein the fly wheeling current absorbing element is a zener diode of a zener voltage that is equal in level to a voltage at a terminal of a battery to be connected to the vehicle alternator.

10. The electric power generation control apparatus according to claim 1, further comprising an electric power source circuit configure to receive an ignition signal transferred from an ignition switch of the vehicle and to generate an operation voltage to be supplied to the circuits forming the electric power generation control apparatus in order to start operation of those circuits.

11. The electric power generation control apparatus according to claim 10, further comprising an electric generation detection circuit configured to detect a voltage generated by a stator winding in the vehicle alternator and to send a detection result to the electric power source circuit.

* * * * *